US 11,307,916 B2

(12) United States Patent
Roy et al.

(10) Patent No.: US 11,307,916 B2
(45) Date of Patent: Apr. 19, 2022

(54) METHOD AND DEVICE FOR DETERMINING AN ESTIMATED TIME BEFORE A TECHNICAL INCIDENT IN A COMPUTING INFRASTRUCTURE FROM VALUES OF PERFORMANCE INDICATORS

(71) Applicant: BULL SAS, Les Clayes-sous-Bois (FR)

(72) Inventors: Jean-François Roy, Claix (FR); Kaoutar Sghiouer, Compiegne (FR); Guillaume Porcher, Grenoble (FR); Pierre Seroul, Sinard (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/927,162

(22) Filed: Jul. 13, 2020

(65) Prior Publication Data
US 2021/0026725 A1    Jan. 28, 2021

(30) Foreign Application Priority Data
Jul. 15, 2019   (FR) ........................................ 1907985

(51) Int. Cl.
*G06F 11/30*    (2006.01)
*G06F 11/07*    (2006.01)

(52) U.S. Cl.
CPC ...... *G06F 11/0757* (2013.01); *G06F 11/0778* (2013.01)

(58) Field of Classification Search
CPC ................. G06F 11/0757; G06F 11/0778
See application file for complete search history.

(56) References Cited

U.S. PATENT DOCUMENTS

2007/0276631 A1* 11/2007 Subramanian ........ G06F 11/008
                                                                                  702/186
2016/0266962 A1* 9/2016 Rajasekharan ....... H04L 41/142
(Continued)

FOREIGN PATENT DOCUMENTS

EP          3051421 A1    8/2016
FR          3066844 A1   11/2018

OTHER PUBLICATIONS

Kale, et al. "Machine Learning Based Dynamic Cause Maps for Condition Monitoring and Life Estimation." 2018 IEEE. 10 pages.
(Continued)

*Primary Examiner* — Matthew M Kim
*Assistant Examiner* — Kyle Emanuele
(74) *Attorney, Agent, or Firm* — Arc IP Law, PC; Joseph J. Mayo

(57) ABSTRACT

A method for determining an estimated duration before a technical incident in a computing infrastructure, executed by a computing device. The computing device including a data processing module, a storage module that stores in memory at least one correlation base between performance indicators, wherein the correlation base includes values of duration before becoming anomalous between correlated performance indicators, and a collection module. The method includes receiving performance indicator values, identifying anomalous performance indicators, identifying first and other at-risk indicators. The method includes determining an estimated duration before a technical incident including a calculation, from the anomalous indicators and at-risk indicators, a shorter path leading to a risk of technical incident, and a calculation of an estimated duration before a technical incident. The estimated duration is calculated from the values of duration before becoming anomalous between
(Continued)

correlated performance indicators for each of the performance indicators constituting the shortest path calculated.

12 Claims, 4 Drawing Sheets

(56) References Cited

U.S. PATENT DOCUMENTS

| | | | |
|---|---|---|---|
| 2018/0032399 A1* | 2/2018 | Johnson | G06F 11/2033 |
| 2019/0163546 A1* | 5/2019 | Ungar | G06F 11/34 |
| 2020/0409780 A1* | 12/2020 | Balasubramanian | G06F 11/3065 |

OTHER PUBLICATIONS

Atamuradov, et al. "Prognostics and Health Management for Maintenance Practitioners—Review, Implementation and Tools Evaluation." International Journal of Prognostics and Health Management. 2017. 31 pages.

* cited by examiner

METHOD AND DEVICE FOR DETERMINING AN ESTIMATED TIME BEFORE A TECHNICAL INCIDENT IN A COMPUTING INFRASTRUCTURE FROM VALUES OF PERFORMANCE INDICATORS

The present invention relates to the field of predictive maintenance, and more particularly to a device, a method, a program and a storage medium for detecting anomalies within a heterogeneous environment and determining an estimated duration before failure of a computing infrastructure, in particular from data generated by probes dedicated to monitoring performance indicators of the computing infrastructure.

PRIOR ART

Computing infrastructures are composed of an increasingly large number of interconnected components, whether these are hardware components or software components. In these computing infrastructures, the multiplicity of these components leads to a high risk of system failure. In addition, these computing infrastructures are often heterogeneous and changeable, leading to diversity of the hardware components and of the software components on the one hand, and a change in the characteristics thereof over time, on the other hand.

In recent complex and distributed computing infrastructures, it is desirable to provide autonomous functions in the computing system itself in order to eliminate the necessity for permanent monitoring of the system by a human administrator. This has led to the development of computing infrastructure monitoring devices, making it possible to identify anomalies in the behavior of the different hardware or software components of the computing infrastructure.

Thus, with these monitoring methods or devices, a technical incident (e.g. a fault, a slowing down, a failure, etc.) which occurs in a computing infrastructure can be detected in the form of anomalies in one or more performance indicator measurements. These measurements may for example correspond to performance measurements (for example, the mean response time of the server, the server time distribution histogram, the file size page, the number of slow pages, the number of transactions, etc.), the parameters of the network (for example network throughput, network latency, etc.), and system measurements (for example CPU usage, memory usage, etc.). Performance indicator monitoring techniques are well known for monitoring computing infrastructures, with for example the use of probes such as resource monitors, capable of monitoring a computing system and of providing network, application and/or system performance values.

Nonetheless, in recent complex and distributed computing infrastructures, the observable performance indicator values vary greatly over time, and techniques in which the observed values are used directly are difficult to apply, since the detection threshold values are not effective. Additionally, a seemingly benign incident may lead, several hours or days later, to a mass failure of the facility. Thus, there is a need for a solution capable of processing the observed values so as to identify, as precisely as possible, anomalous performance indicators.

Additionally, existing monitoring devices or processes generally only report anomalies. However, with both the complexity and the increasing size of computing infrastructures, maintenance services are overwhelmed with anomaly or failure warnings.

Moreover, aside from generating warnings which may be characterized by a failure risk value or a criticality level, the maintenance team might benefit from information on the estimated duration before the technical incident (i.e. failure). Where necessary, they could prioritize the action they take based on criticality on the one hand and urgency on the other.

More specifically, there is a need for novel solutions making it possible to anticipate the predictive maintenance requirements on a computing infrastructure capable of reducing the response time of the maintenance service and of reducing failures on the computing infrastructure being monitored and even capable of enabling the maintenance service to take action before service interruption is triggered, thus reducing the response time of the maintenance service and reducing the occurrence of failures on the computing infrastructure being monitored.

Technical Problem

The object of the invention is therefore to overcome the shortcomings of the background art. In particular, the object of the invention is to propose a method for determining an estimated duration before a technical incident in an infrastructure, said method making it possible to determine this duration from weak signals. The method is further able to evolve so as to take into account modifications to the infrastructure. Another object of the invention is to propose a device capable of executing such a method and also a program and a storage medium carrying this program.

BRIEF DESCRIPTION

To this end, a first aspect of the invention proposes a method for determining an estimated duration before a technical incident in a computing infrastructure, said method being executed by a computing device, said computing device comprising a data processing module, a storage module configured to store in memory at least one correlation base, said correlation base comprising values of duration before becoming anomalous between performance indicators, and a collection module, said method comprising:

a step of receiving, by the collection module, performance indicator values of a computing infrastructure, a step of identifying anomalous performance indicators, by the data processing module, said identification comprising an analysis of the performance indicators so as to identify abnormal values and performance indicators associated with these abnormal values, a step of identifying first at-risk indicators, by the data processing module from the correlation base, said first at-risk indicators being performance indicators that are correlated with the anomalous performance indicators identified, a step of identifying other at-risk indicators, by the data processing module from the correlation base, said other at-risk indicators being performance indicators that are directly or indirectly correlated with the first at-risk performance indicators identified, and a step of determining, by the data processing module, an estimated duration before a technical incident in the computing infrastructure, said estimated duration before a technical incident being calculated from values of duration before becoming anomalous of the correlation base for the first at-risk indicators identified and the other at-risk indicators identified.

Such a method makes it possible, by virtue of determining an estimated duration before a technical incident, to anticipate the occurrence of a technical incident within a computing infrastructure. Anticipating incidents is made complex due to the large variability in the operating metrics of these infrastructures. Here, the method makes use of the high level of interdependency of the software and hardware components on the computing infrastructures, making the management of these infrastructures highly complex.

Such a method makes it possible, by virtue in particular of the use of values of duration before becoming anomalous between correlated performance indicators, to predict the estimated moment of occurrence of a technical incident within a computing infrastructure.

In particular, collecting metrics values (i.e. performance indicators) and processing them makes it possible to detect one or more anomalous performance indicators from abnormal values, then to enhance these anomalous performance indicators with data relating to performance indicators at risk of becoming anomalous.

This data can subsequently be analyzed in order to identify a shorter path leading to a risk of technical incident, then this shorter path coupled with values of duration before becoming anomalous between correlated performance indicators makes it possible to estimate a duration before technical incident. Thus, a method according to the invention makes it possible to detect and predict failures from weak signals which would have eluded the monitoring services (or which have already eluded the vigilance of the monitoring services) and also to generate an estimated duration before a technical incident.

According to other optional characteristics of the method:

- the value of duration before becoming anomalous corresponds to the duration between an occurrence of an abnormal value for the performance indicator in question and an occurrence of an abnormal value for a performance indicator correlated with the performance indicator in question. Thus, it is possible to convert the shortest path into a chain of temporal values which, when added together, can give an indication as to the estimated duration before technical incident.
- the determination step comprises a calculation, from the first at-risk indicators identified and the other at-risk indicators identified, of several paths leading to a risk of technical incident. Thus, the estimated duration before a technical incident of the computing infrastructure will be able to be selected from several alternatives, and the administrators will be able to be warned about all the failure risks to be monitored.
- the determination step comprises a calculation, from the first at-risk indicators identified and the other at-risk indicators identified, of a shorter path leading to a risk of technical incident. The use of a calculation of the shortest path makes it possible to quickly identify a potential sequence of anomalies which will most quickly lead to failure of the computing infrastructure.
- the step of identifying anomalous performance indicators is preceded by a step of processing the collected data, said step of processing the collected data comprising a deletion of a normal component. This normal component is for example taken into account hour by hour, day by day, with weekly repetition. Nevertheless, depending on the indicators, the period of repetition and the frequency of sampling can be adjusted. For example, if data (e.g. performance indicator values of the computing infrastructure) over several years is available, then the monthly component could be taken into account.
- the identification of abnormal values is carried out by a statistical method making it possible to generate values of distances to normality.
- the step of identifying anomalous indicators comprises, for each performance indicator, the calculation of an expected value then a comparison between the expected values and the collected values.
- the identification of performance indicators of the computing infrastructure that are correlated with the anomalous indicators identified is carried out based on inter-performance indicator causal correlations. For example, the correlation base can also store in memory the causal links, and these causal links can be tagged in a different manner relative to non-causal correlation links.
- it further comprises a step of calculating a technical incident risk value. Indeed, by virtue of the data on the at-risk performance indicators, it is possible to calculate a technical incident risk value that reflects a probable behavior of the computing infrastructure 5 in the coming hours.
- it further comprises a step of determining, by the data processing module, an anomaly prediction performance index value comprising: receiving new performance indicator values; identifying new confirmed anomalous indicators, said identification comprising an analysis of the new performance indicator values so as to identify abnormal values and performance indicators associated with these abnormal values, and comparing identified at-risk indicators to the new confirmed anomalous indicators so as to generate a performance index value. Such a step makes it possible, by virtue of determining a performance index, to verify if the anticipated occurrence of a technical incident within a computing infrastructure is correct. Advantageously, the verification may be carried out continuously and in real time. Thus, a method according to the invention makes it possible to evaluate, over time, the predictive performance of a predictive maintenance method intended for detecting and anticipating failures from weak signals.
- it further comprises a step of generating updated values of duration before becoming anomalous, a value of duration before becoming anomalous corresponding to a duration between an occurrence of an abnormal value for the performance indicator in question and an occurrence of an abnormal value for a performance indicator correlated with the performance indicator in question. In the case of updated values of duration before becoming anomalous, this corresponds to the duration between becoming anomalous of an anomalous performance indicator and becoming anomalous of an at-risk performance indicator that is correlated therewith. Thus, the method makes it possible to acquire actual real-time data relating to the dynamics of progression of anomalies that may lead to a technical incident.
- the correlation base comprises values of durations before becoming anomalous between performance indicators, and the method further comprises a step of modifying the values of durations before becoming anomalous between performance indicators that are stored in memory in the correlation base, based on updated values of duration before becoming anomalous. Thus, it is possible, over time and preferably continuously, to update the elements used in the prediction of anomalies and/or of technical incidents. A method according to the invention will then be more precise, and less sensitive to changes in the computing infrastructure or the use thereof.

It comprises a step of storing in memory, for each performance indicator, of: a unique identifier and at least one unique identifier of another performance indicator correlated therewith, with a value of duration before becoming anomalous of this other performance indicator.

The invention further relates to a computer program for determining an estimated duration before a technical incident in a computing infrastructure able to, preferably configured to, implement a determination method according to the invention.

The invention further relates to a storage medium on which a computer program for determining an estimated duration before a technical incident in a computing infrastructure according to the invention is stored.

The invention further relates to a computing device for determining an estimated duration before a technical incident in a computing infrastructure, said computing device comprising a data processing module, a storage module configured to store at least one correlation base between performance indicators in memory, said correlation base comprising values of duration before becoming anomalous between correlated performance indicators, and a collection module,
said collection module being able to, preferably configured to, receive performance indicator values of the computing infrastructure, said data processing module being configured to execute the following steps:
  a step of identifying anomalous performance indicators, said identification comprising an analysis of the performance indicator values so as to identify abnormal values and performance indicators associated with these abnormal values,
  a step of identifying first at-risk indicators, from the correlation base, said first at-risk indicators being performance indicators that are correlated with the anomalous performance indicators identified,
  a step of identifying other at-risk indicators, from the correlation base, said other at-risk indicators being performance indicators that are directly or indirectly correlated with the first at-risk performance indicators identified, and
  a step of determining an estimated duration before a technical incident, said estimated duration before a technical incident being calculated from values of duration before becoming anomalous of the correlation base for the first at-risk indicators identified and the other at-risk indicators identified.

A computing device according to the invention has the same advantages as a method in accordance with the invention and in particular makes it possible to detect and predict failures from weak signals which would have eluded the monitoring services (or which have already eluded the vigilance of the monitoring services) and also to generate an estimated duration before technical incident.

Other benefits and features of the invention will become apparent upon reading the following description, given by way of illustrative and non-limiting example, with reference to the accompanying drawings.

Figure 1:
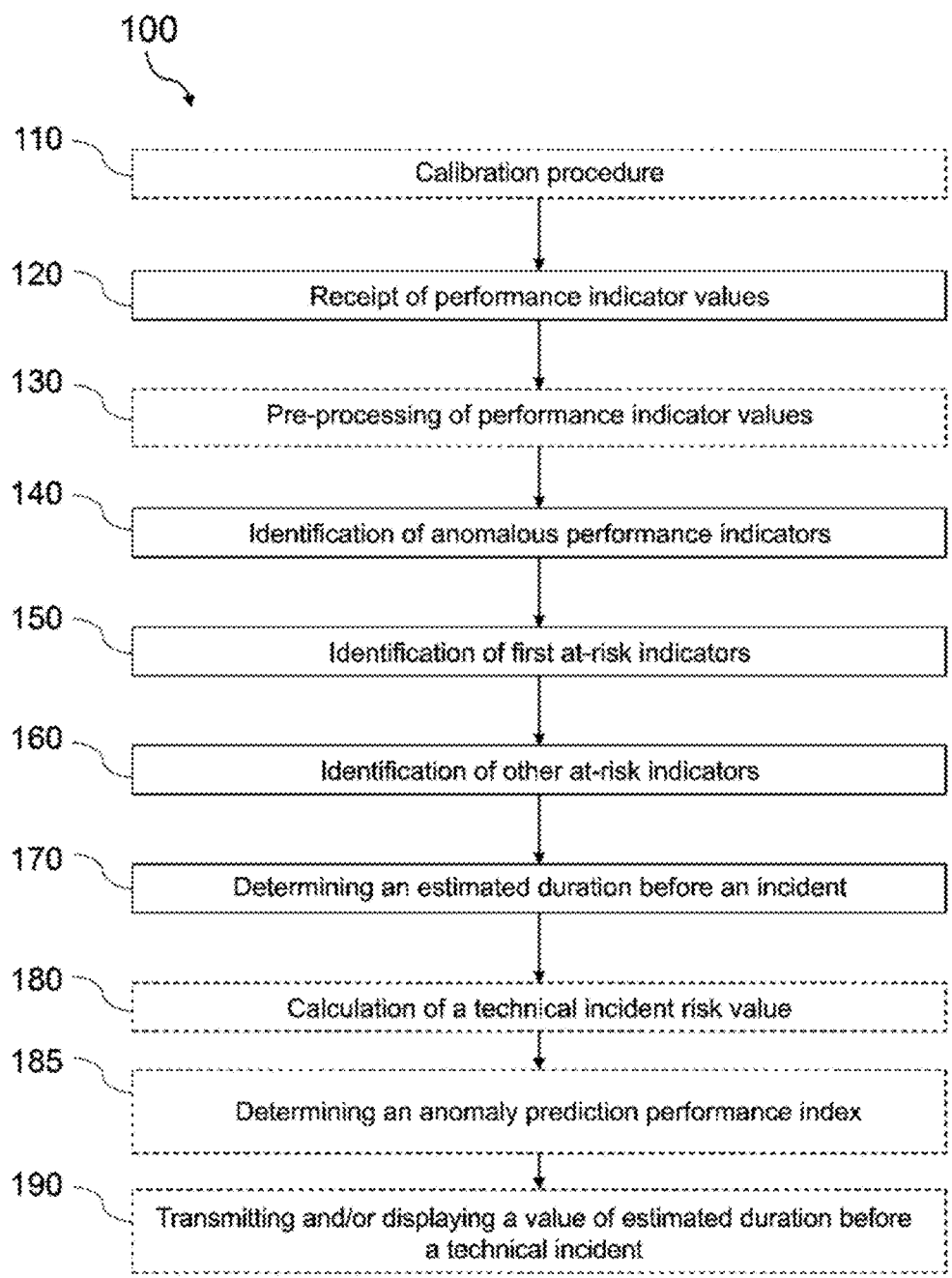
FIG. 1 shows a schematic illustration of a method for determining an estimated duration before technical incident on a computing infrastructure according to the invention. The steps in dashed boxes are optional.

Some aspects of the present invention are disclosed with reference to flow charts and/or to functional diagrams of methods, apparatuses (systems) and computer program products according to embodiments of the invention. In the drawings, the flow charts and functional diagrams illustrate the architecture, the functionality and the operation of possible implementations of systems, methods and computer program products according to various embodiments of the present invention. In this respect, each block in the flow diagrams or block diagrams may represent a system, device, module or code, which comprises one or more executable instructions to implement the specified logical function(s). In some implementations, the functions associated with the blocks may appear in a different order than that shown in the figures. For example, two blocks shown in succession may, in fact, be executed substantially simultaneously, or the blocks may sometimes be executed in the reverse order, depending on the functionality involved. Each block in the block diagrams and/or flow diagrams, and combinations of blocks in the block diagrams and/or flow diagrams, may be implemented by special hardware systems that perform the specified functions or execute or perform combinations of special hardware and computer instructions.

DESCRIPTION OF THE INVENTION

For the purposes of the invention, in the remainder of the description, the expression "anomaly vector" corresponds to an object, or a data structure, such as a one-way table comprising data relating to anomalous (e.g. associated with this abnormal data) and/or normal performance indicators. Representation in vector form is a representation of data making it possible for example to use matrix calculation operations, optimized in terms of calculation and memory complexity. Nevertheless, it should be noted that it is generally not the vector itself which determines the at-risk indicators. For the purposes of the invention, the expression "augmented anomaly vector" corresponds to an anomaly vector comprising data relating to anomalous performance indicators and also data relating to at-risk performance indicators, said at-risk performance indicators being associated with abnormal values which are at risk of being generated by a computing infrastructure. A vector (e.g. an augmented anomaly vector) according to the invention can have several dimensions, thus be related to one or more matrices and can contain numbers such as integers, Boolean operators, alphanumerical values, etc. Thus, a vector according to the invention may in particular be in the form of dictionaries or chained lists.

For the purposes of the invention, the expression "becoming anomalous" can correspond to an instant at which a metric, or a plurality of metrics (whether or not linked to one another) has a risk, or a result obtained by calculation, of exceeding a predetermined threshold or a threshold indicative of failure or technical incident on the computing infrastructure.

For the purposes of the invention, the term "technical incident" or the term "failure" correspond to a slowing down, or stoppage, of operation of at least part of the computing infrastructure and the applications thereof. A technical incident can be caused by a network error, a failed process or else a failure of part of the system.

For the purposes of the invention, the expression "computing infrastructure" corresponds to a set of computing structures (i.e. computing devices) able to run an application or an application chain. The computing infrastructure may be one or more servers, computers, or else industrial controllers. Thus, the computing infrastructure may correspond to a set of elements comprising a processor, a communication interface and memory.

For the purposes of the invention, "probe" or "computing probe" is intended to mean a device, software or process associated with a device which makes it possible to carry out, manage and/or return to a computing device, measurements of performance indicator values such as parameters of a system. This may broadly correspond to values relating to the resource usage, values of application execution parameters, or else values of the state of operation of the resources. A probe according to the invention therefore also encompasses software or processes capable of generating application logs or event histories (log files). Additionally, probes may also correspond to physical sensors such as sensors of temperature, moisture, water leaks, electricity consumption, motion, air conditioning and smoke.

For the purposes of the invention, the expression "performance indicator" or "metric" corresponds to a technical or functional property of one or more elements of a computing infrastructure or the environment thereof, representing the conditions or state of operation of said computing infrastructure. Additionally, a performance indicator can correspond to a combination of properties or to mathematical transformations of properties. For example, a performance indicator can correspond to the derivative of a property of an element of the computing infrastructure, or else to a relationship between the properties of two elements of the computing infrastructure.

For the purposes of the invention, the expression "performance indicator value" or "metric value" corresponds to a measurement or calculation value of a technical or functional property of one or more elements of a computing infrastructure representing the state of operation of said computing infrastructure.

For the purposes of the invention, the expression "value associated with a performance indicator" corresponds to a value of a parameter linked to a performance indicator. This may correspond to an identifier of a performance indicator, to a duration before failure of an indicator, a Boolean value, or else the result of a measurement aiming to quantify this performance indicator. Preferably, a value associated with a performance indicator is a unique identifier.

For the purposes of the invention, the term "resource" corresponds to parameters, capacities or functions of computing devices enabling the running of a system or an application process. A single computing device is generally associated with several resources. Likewise, the same resource can be shared between several application processes. A resource is generally associated with a unique identifier making it possible to identify same within a computing infrastructure. For example, the term "resource" may include: network disks characterized by performance indicators such as for example by the inputs/outputs thereof, reading/writing from/to disks, memories characterized by a performance indicator such as the rate of usage, a network characterized by the bandwidth thereof, a processor characterized for example by its usage (as a percentage), or the occupancy level, of the caches thereof, a random access memory characterized by the amount allocated. "Resource usage" is intended to mean the consumption of a resource, for example by a business application.

For the purposes of the invention, the term "correlation" corresponds to a statistical relationship, whether causal or non-causal, between two variables or the values of two variables. In the broadest sense, any statistical association is a correlation, but this term denotes for example the proximity between two variables and the establishment of an ordered relationship. For the purposes of the invention, the term "causal" or "causality" corresponds to a causal statistical relationship between two variables or the values of two variables. In particular, one of the variables is a cause which is entirely or partially responsible for the value of the other variable, via an effect. The value of the first variable may for example be considered to be a cause of a (current or future) value of the second variable. Whether in terms of correlation or causality, one or more variables may have a statistical relationship with one or more other variables. Additionally, for the purposes of the invention, an indirect correlation or causation corresponds to the existence of a chain of correlation or causality connections between a first variable and another variable. For example, a first variable is correlated with a second variable which in turn is correlated with a third variable which is finally correlated with another variable.

For the purposes of the invention, the term "learning" corresponds to a process designed to define a function f that makes it possible to calculate a value of Y from a base of n labeled (X1 . . . n, Y1 . . . n) or unlabeled (X1 . . . n) observations. Learning may be said to be supervised when it is based on labeled observations, and unsupervised when it is based on unlabeled observations. In the context of the present invention, learning is advantageously used for calibrating the process and hence adapting it to a particular computing infrastructure.

For the purposes of the invention, "process", "calculate", "execute", "determine", "display", "extract", "compare" or more broadly, an "executable operation", mean an action executed by a device or a processor unless otherwise indicated by the context. In this respect, operations relate to actions and/or processes in a data processing system, for example a computer system or electronic computing device, which manipulates and transforms data represented as physical (electronic) quantities in the memories of the computer system or other devices for storing, transmitting or displaying information. These operations can be based on applications or software programs.

The terms or expressions "application", "software", "program code" and "executable code" mean any expression, code or notation in a set of instructions designed to cause data processing to perform a particular function directly or indirectly (e.g., after a conversion operation to another code). Examples of program code can include, but are not limited to, a sub-program, a function, an executable application, a source code, an object code, a library and/or any other sequence of instructions designed for execution on a computer system.

For the purposes of the invention, "processor" means at least one physical circuit configured to execute operations according to instructions contained in a code. The physical circuit can be an integrated circuit. Examples of a processor include, but are not limited to, a central processing unit, a graphic processor, an application-specific integrated circuit (ASIC) and a programmable logic circuit.

For the purposes of the invention, "coupled" means directly or indirectly connected to one or more intermediate elements. Two elements may be coupled mechanically, electrically or linked by a communication channel.

For the purposes of the invention, the expression "man-machine interface" corresponds to any element that allows a human being to communicate with a computer; in particular, and without this list being exhaustive, a keyboard, and means making it possible, in response to the orders entered on the keyboard, to effect displays and optionally to select elements displayed on the screen using the mouse or a touch pad. Another exemplary embodiment is a touchscreen that makes it possible to select, directly on the screen, the elements touched by the finger or an object, and optionally with the possibility of displaying a virtual keyboard.

For the purposes of the invention, the expression "connected object" is an electronic object connected, by a wired or wireless connection, to a data transport network, such that the connected object can share data with another connected object, a server, a fixed or portable computer, an electronic tablet, a smartphone or any other connected device of a given network. In a known manner, such connected objects can be, for example, tablets, smart lighting devices, industrial tools or even smartphones.

In the remainder of the description, the same reference signs are used to designate the same elements.

As has been mentioned, there are numerous computing infrastructure maintenance systems. Nonetheless, existing systems merely analyze one or more key indicators of the performance of a computing infrastructure and warn a maintenance team when values of this (these) indicator(s) exceed threshold values or exhibit behavior previously identified as a source of a technical incident.

Thus, with the methods of the prior art, it is common for the maintenance team to receive notification relatively late due to a lack of sensitivity of the method, or for the warning to be a false alarm since the pre-established threshold is too weak to have a high degree of specificity and hence to effectively discriminate between normal values and abnormal values.

As will be detailed hereinafter, the inventors have developed a device and a method for determining an estimated duration before a technical incident with a balance between specificity and sensitivity. Advantageously, a device and a method for determining an estimated duration before a technical incident according to the invention will have a greater specificity than sensitivity. Indeed, while sensitivity is important since is it an indicator of the proportion of actual incidents predicted, specificity is much more important since it is an indication of the capacity not to overburden operators with false alarms.

To this end, the inventors are in particular proposing a method and a device that are capable of identifying performance indicators at risk of becoming anomalous and, from these at-risk indicators, an estimated duration before technical incident. Indeed, within a complex system (for example a set of servers, applications or devices within a data center), some anomalies in one or more metrics (i.e. performance indicators) can be caused by other anomalies occurring in other metrics, thereby leading to a domino effect. It is possible, from the knowledge of the domino effect and the durations between becoming anomalous of the performance indicators, to deduce therefrom an estimated duration before technical incident.

Based in particular on correlations observed between performance indicators, the aim is in particular to identify:
a set of performance indicators comprising performance indicators having abnormal values, and also
performance indicators which have normal values at the time the anomalous performance indicators are identified, but which have a high probability of having, in the minutes or hours that follow, abnormal values.

Thus, it is possible to determine an estimated duration before a technical incident, enabling maintenance teams to take action more quickly and more effectively on the computing infrastructure. This also makes it possible to prioritize their actions.

As will be described hereinafter, the invention is of particular benefit in monitoring a computing infrastructure of a service-sector company comprising a plurality of computer stations and distributed servers used by its employees or else in monitoring a computing infrastructure of a company that provides servers or virtual machines to its clients. Nevertheless, this invention will be equally applicable in a computing infrastructure managing the sensors in an industrial company or more broadly a plurality of connected decentralized objects.

As shown in FIG. 1, according to a first aspect, the invention relates to a method 100 for determining an estimated duration before a technical incident in a computing infrastructure.

This determination method is based in particular on performance indicator values. Performance indicators which can be used in the context of the present invention are for example: resource usage, event logs, software errors, hardware errors, response time, application traffic, working load, network traffic, file modifications, the number of users of a service, session number, process number, temperature values, relative humidity values, and power consumption. In particular, performance indicators can include: network throughput, network latency, CPU usage, memory usage, server response time, number of slow pages and/or number of transactions.

These performance indicator values are for example generated by computing probes dedicated to monitoring performance indicators of the computing infrastructure. Such computing probes will be described in detail hereinafter. Thus, the method can be carried out at least in part using performance indicator values generated by probes dedicated to monitoring performance indicators of the computing infrastructure.

In the context of a method according to the invention, the values of the performance indicators are preferably measured continuously. Continuous monitoring corresponds, for example, to measurements performed at a frequency of less than or equal to one hour, preferably less than or equal to thirty minutes, more preferably less than or equal to five minutes, for example less than or equal to ten seconds. It should be noted that not all performance indicators will necessarily be measured at an identical frequency.

Additionally, in the context of a method according to the invention, the estimated duration before a technical incident in a computing infrastructure is preferably determined in real time. In particular, starting from the measurement of performance indicator values, a method according to the invention is preferably configured to generate a value of estimated duration before a technical incident within a time of less than or equal to ten minutes, more preferably less than or equal to five minutes, even more preferably less than or equal to one minute. Thus, a method according to the invention is configured to predict risks of an incident at least fifteen minutes before their anticipated occurrence, more preferably at least one hour before their anticipated occurrence, and even more preferably at least several hours before their anticipated occurrence, for example at least three hours before their anticipated occurrence.

As shown in FIG. 1, a determination method 100 according to the invention comprises a step of receiving 120 performance indicator values, a step of identifying 140 anomalous performance indicators, a step of identifying 150 first at-risk indicators, a step of identifying 160 other at-risk indicators and a step of determining 170 an estimated duration before an incident.

A determination method according to the invention may further comprise a step of pre-processing 130 the collected performance indicator values, a step of calculating 180 a technical incident risk value and/or a step of transmitting and/or displaying 190 an estimated duration before a technical incident and optionally a technical incident risk value.

Figure 2:
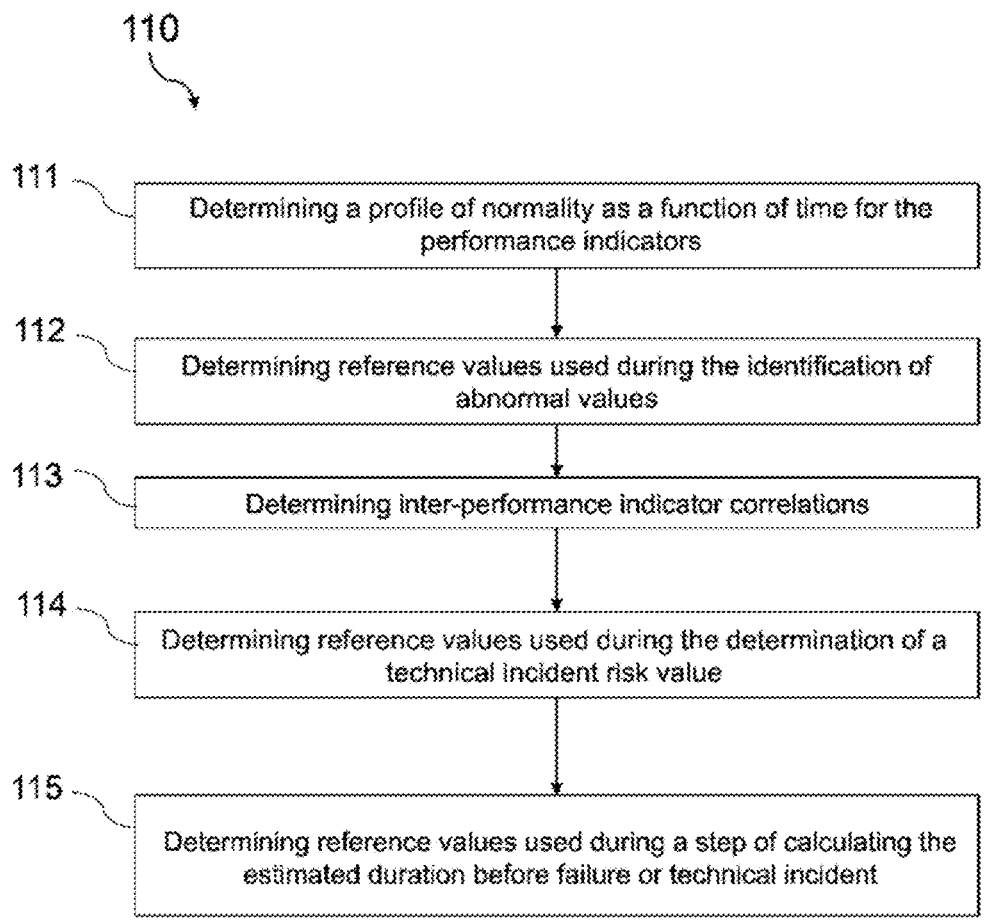
FIG. 2 shows a schematic illustration of a prior calibration process.

Moreover, advantageously, a determination method according to the invention can also comprise a prior calibration procedure 110. FIG. 2 shows the possible steps of the calibration procedure 110.

As shown, the calibration procedure 110 may comprise a step of determining 111 a profile of normality as a function of time for performance indicators, a step of determining 112 reference values used during the identification of abnormal values, a step of determining 113 inter-performance indicator correlation, a step of determining 114 reference values used during the determination of a technical incident risk value (e.g. determining a technical incident risk value) and a step of determining 115 values of duration before becoming anomalous between correlated performance indicators, used wholly or partially during the calculation of the estimated duration before failure or technical incident.

These different steps are at least partially based on the general principles of statistical mathematics and more particularly on learning, whether supervised or unsupervised. Additionally, these different steps can preferably include steps of dimensionality reduction.

Preferably, the calibration procedure 110 comprises steps of supervised and/or unsupervised learning based on values generated from the monitored computing infrastructure. Thus, the reference values can be particularly adapted to the computing infrastructure monitored by a method and/or a device according to the invention.

Additionally, the calibration procedure 110 can begin with pre-processing of the performance indicator values so as to facilitate the subsequent use thereof. Pre-processing according to the invention can for example comprise: data normalization, re-sampling, data aggregation, and/or recoding of variables.

Such a method preferably comprises a step 111 of determining a profile of normality as a function of time for performance indicators. This "normal" profile may for example correspond to a model of the global population or to statistics summarizing the global population. Use of the "normal" profile subsequently makes it possible to detect anomalies, the anomalies being in particular observations for which the characteristics differ significantly from the normal profile for example in the context of a first-order relationship.

Preferably, a determination method according to the invention can comprise a prior step of learning "normal" performance indicator values. In particular, there is a training of a model (i.e. learning) that makes it possible to know the "normal" values as a function of time. This step preferably makes it possible to generate a profile of values for the performance indicators as a function of time. Thus, advantageously, the calibration procedure 110 comprises determining a profile of normality as a function of time for each of the performance indicators.

The majority of companies follow, in their operation, cyclical models, with events that reoccur with an hourly, daily, weekly, monthly and sometimes annual frequency. The same applies for the computing infrastructures underlying the operation of these companies. The normality profile then preferably comprises a period value.

Aside from the seasonality of the values in data of chronological series, trend is another important factor. Thus, preferably, the calibration procedure 110 comprises determining 111 a profile of normality as a function of time with a periodicity of less than or equal to one year for the performance indicators and also a global change component (i.e. trends of change in the data, whether upward or downward). The combination of taking into account both of these factors enables good anticipation of a chronological series.

Indeed, the performance indicator values in the context of temporal series will generally comprise a normal component, a trend or global change component, and a residual. In the context of the detection of an anomaly, the normal component relates to the manner in which things change over a given period, for example a year, month, week, day; the trend component takes into account the trend of the manner in which things change; and the residue value will make it possible to determine as precisely as possible whether or not an anomaly is present.

In particular, the performance indicator values are temporal series and are therefore associated with a temporality (weekly, daily, hourly, monthly, etc.). In this context, there are numerous methods making it possible to isolate abnormal values from these temporal series.

For example, a method according to the invention may implement a seasonal trend decomposition based on STL local regression (A Seasonal-Trend Decomposition Procedure Based on Loess. Clevland et al. Journal of Official Statistics. Vol. 6. No. I. 1990. pp. 3-73). This method makes it possible to divide the temporal series signal into three parts: seasonal, trend and residual. Such a method additionally has the advantage of enabling rapid calculation, even for very long chronological series and large amounts of trend and seasonal smoothing.

Alternatively, a method according to the invention may implement a Holt-Winters method. This method makes it possible, from a period value, to calculate the residual, trend and seasonal components at each estimated time step. The initial baseline level will be the average, while the initial trend component will be the average of all the gradients calculated in the first two seasonal cycles.

Another method, referred to as ARIMA ("Autoregressive integrated moving average") makes it possible to anticipate the values of the performance indicators and to participate in detecting abnormal values. The ARIMA method is based on an approach according to which several points in the past generate a prediction of the next point with the addition of a random variable (e.g. order of difference) generally corresponding to noise. Like the Holt-Winters method, the effect of this is to smooth the prediction of the normal component and of the trend component. Thus, alternatively, a method according to the invention may implement an ARIMA method. Advantageously, the method then comprises the reception of values of parameters associated with the number of differences, to the number of autoregressions and to the coefficients of prediction errors so as to configure the method.

Additionally, regardless of the method used to decompose the signal into these three components (i.e. residual, normal component and trend component), a method according to the invention can comprise two different forms of seasonality models: the additive form and the multiplicative form. Indeed, the manner in which these three components interact determines the difference between a multiplicative and additive temporal series.

In its additive form, the variation in the seasonal fluctuation of a performance indicator (i.e. metric) is a constant number, while in its multiplicative form it represents a percentage of the performance indicator. Thus, for larger values, the modification of the successive cycle will be larger in the case of a multiplicative form.

In the context of an additive model, the different components (i.e. normal and trend) have an additive incidence on the chronological series. For example, in a model of data for which one cycle is one month, an additive model assumes that the difference between the values of January and March is approximately the same each year. In other words, the amplitude of the seasonal effect is the same each year. Likewise, the model assumes that the residuals have approximately the same size throughout the series. They then constitute a random component which is added to the other components in the same manner for all parts of the series.

Nevertheless, in the context of the present invention, the inventors have determined that, for certain performance indicators, a multiplicative model will be better suited, while an additive model will be better suited for other performance indicators. A method according to the invention therefore preferably comprises the calculation of an additive model and a multiplicative model.

Additionally, the chronological series can be analyzed and modeled by algorithms such as STL, ARIMA, LSTM and Holt-Winters.

Once the calibration step has been set up, it is possible to use this data to detect anomalies by comparing them to actual data.

The identification of the abnormal values described below may be at least partly based on a calculation of a normal component and optionally of a trend component. Indeed, the value resulting from the deletion/deduction of the normal component and optionally of the trend component from the value of a performance indicator consists of a residual component, which can correspond to a normal value or to an abnormal value.

The detection of abnormal, or anomalous, values generally comprises the identification of several data points that are highly different from the rest of the data. There is a very large number of different methods making it possible to carry out such a detection of abnormal values. The majority are based on comparing measured values to reference values. In order to accelerate the analysis of these residuals, the inventors have developed a prior step of calibration, the result of which can be used during the step of identifying 140 anomalous performance indicators so as to identify the abnormal values more quickly. Thus, preferably, the calibration procedure 110 can comprise a step of determining 112 reference values that can be used during the identification of abnormal values, and more particularly during the step of identifying 140, anomalous performance indicators (i.e. those having abnormal values).

Among the numerous possible methods for identifying an abnormal value, a distinction can be made between unsupervised and supervised approaches.

A step of determining 112 reference values according to the invention can implement an unsupervised learning method. Indeed, while the detection of anomalies can be solved by supervised learning algorithms if information regarding abnormal behavior before the modeling is available, this information may be lacking during a first installation of the method according to the invention in a computing infrastructure, and unsupervised learning algorithms are favored.

In particular, the unsupervised learning method can be based on a probabilistic model. Thus, an unsupervised learning method implemented during the step of determining 112 reference values can for example comprise a search for univariate extreme values or a search for multivariate extreme values. When the step of determining 112 reference values according to the invention comprises a search for univariate extreme values, this search may for example be carried out via a Grubbs test. When the step of determining 112 reference values comprises a search for multivariate extreme values, this search may for example be carried out via an evaluation of the Mahalanobis distance.

The unsupervised learning method may be based on a notion of proximity. Thus, advantageously, an unsupervised learning method implemented during the step of determining 112 reference values can for example comprise a clustering, a density calculation or a nearest neighbor search.

Clustering is not initially intended for the detection of abnormal observations, since it essentially makes it possible to determine groups of observations. Nonetheless, groups containing relatively few observations can be considered to correspond to potentially abnormal observations.

In particular, clustering makes it possible to group data together in groups of different densities, the points of a small group generally corresponding to abnormal data. During the study of a new performance indicator value, a method according to the invention can comprise a calculation of the distance between the new performance indicator value and the groups. If the new value is far removed from all the other points of the groups of normal values, then the new value can be considered to be an abnormal value.

The density calculation may for example correspond to algorithms of the LOF ("Local Outlier Factor"), GLO ("Global Local Outlier"), or DBSVM ("Density Based Support Vector Machines") type. In particular, the density calculation may comprise the calculation, for each point, of a density of its local neighborhood (k) then the calculation of a local exceedance factor of a sample p as the average of the ratios of the density of the sample p and the density of its nearest neighbors. The abnormal values are then the points with the largest local exceedance factor value.

A determination method according to the invention may also implement supervised approaches for the identification of abnormal values of performance indicators. In particular, a step of determining 112 reference values according to the invention can then comprise implementing a supervised learning method.

Among supervised learning methods, neural networks, classification trees, nearest neighbor search or regression trees are among the most robust and most effective automatic learning techniques in the context of a method according to the invention.

It is for example possible to use a supervised learning step to teach trees to classify abnormal value and normal value points. To this end, the method preferably comprises a prior step of receiving labeled performance indicator values, said labeled performance indicator values having preferably been generated via an unsupervised learning method.

In a preferred embodiment, unsupervised learning is used to identify abnormal values then this data is used to train a supervised learning algorithm such as a CART ("Classification and Regression Trees") algorithm.

The CART algorithm can then be configured to make it possible to assign a "normal" or "anomalous" label to the current value of the metric.

Alternatively, a method according to the invention may implement an ARIMA ("autoregressive integrated moving average") algorithm or any algorithm set up in the context of step 111. In particular, a step of determining 112 reference values according to the invention can comprise a calculation of the next performance indicator value in a series of data, said calculation comprising the addition of a random variable, then the method may comprise a step of comparing the measured performance indicator value with the next calculated performance indicator value.

In the context of the invention, an LSTM ("long short-term memory") neural network of can also be used.

Preferably, the calibration procedure 110 can comprise a step of determining 113 inter-performance indicator correlation. More preferably, the calibration procedure 110 can comprise a step of determining an inter-performance indicator causal link. The identification of causal relationships can be carried out by different techniques, for example studying correlations between metrics.

Indeed, the calculation of the augmented anomaly vector is based on the identification of performance indicators at risk of anomaly, and this prediction is advantageously generated using historical information from the computing infrastructure. In particular, a method according to the invention may be based on inter-metrics links, in order to characterize that the (established or probable) act of becoming anomalous of one or more metrics is such that it leads to one or more other metrics (i.e. performance indicators) becoming anomalous.

Preferably, the determining 113 of inter-performance indicator correlations is carried out via statistical methods such as the Pearson method or Spearman's method. In particular, this determination may be based on past values (e.g. 1 to 3 months) generated during normal operation and/or during the act of a performance indicator becoming anomalous (the act of the other metrics becoming anomalous is then studied).

Additionally, the correlations may be calculated on temporally synchronized signals or taking into account an offset in time (for example using cross-correlation calculation methods).

More preferably, a determination 113 of inter-performance indicator correlations comprises establishing correlations between at least three performance indicators. For example, a sum of the performance indicator values A and B is correlated with a performance indicator C becoming anomalous.

Additionally, preferably, a determination 113 of inter-performance indicator correlations comprises correlations between transformed data of one or more performance indicator values. In particular, the variation (i.e. derivative value) of one or more metrics is correlated with a performance indicator becoming anomalous. For example, the volatility of the performance indicator A is correlated with a performance indicator C becoming anomalous.

Preferably, the calibration procedure 110 may comprise a step of determining 114 reference values used during a determination of a technical incident risk value.

Indeed, once the anomalous performance indicators and at-risk performance indicators have been identified, these indicators, for example in the form of an augmented anomaly vector, can be studied so as to determine whether or not they are indicators of a risk of technical incident. There are numerous methods for determining a technical incident risk value from an augmented anomaly vector, or more broadly from anomalous performance indicators and at-risk performance indicators identified. The step 180 of determining a technical incident risk value which will be described hereinafter can in particular rely on reference values used during identification of a risk of a technical incident.

A method according to the invention can for example implement predetermined thresholds or predetermined patterns. The reference values can then be predetermined thresholds and be for example input by an operator via a graphics interface.

Nevertheless, the reference values used during the identification of a risk of failure are preferably determined during a prior calibration step, said prior calibration step preferably being specific to the computing infrastructure studied.

In particular, in the context of a method according to the invention, a technical incident database may be formed and updated, comprising data relating to anomalous performance indicators and at-risk performance indicators (e.g. in the form of an augmented anomaly vector) observed during the occurrence, or preferably before the occurrence, of a technical incident.

Preferably, the methods for determining a risk of technical incident may also relay on supervised or unsupervised learning methods.

Among the unsupervised methods, the step of determining 114 reference values used during the identification of a risk of technical incident may comprise unsupervised partitioning of the augmented anomaly vectors so as to identify similar vectors and to group them together by cluster (i.e. packet, group). Next, a supervised learning portion may comprise labeling certain clusters of augmented anomaly vectors which are associated or not associated with technical incidents.

In the category of supervised learning, it is also possible, during the detection of a technical incident, to assign a label corresponding to an augmented anomaly vector associated with a technical incident to all the augmented anomaly vectors preceding the incident. Thus, if in future a pattern similar to such an augmented anomaly vector is generated, then it will be considered to have a probability of leading to a technical incident.

Additionally, there may be noise in the detection of anomalies and the presence of anomalies that are not correlated with the incident. Thus, it is advantageous in the context of the invention to implement a tuning step. Tuning is a technique used to adjust a function or a model by adding an additional penalty term into the error function. This technique of controlling or reducing the value of the error coefficients is referred to as the pruning method in the case of neural networks. It makes it possible to limit the risks associated with over-learning.

Preferably, the step of determining 114 reference values used during determination of a technical incident risk value can comprise supervised learning comprising implementing an algorithm selected from: k nearest neighbor method, decision tree forest, or support vector machine.

For example, a step of determining 114 reference values used during determination of a technical incident risk value can comprise semi-supervised learning. In this case, the step of determining 114 reference values can implement one or more algorithms selected from: clustering, principal component analysis and k nearest neighbor method.

Preferably, the calibration procedure 110 may comprise a step of determining 115 reference values used during a step of calculating the estimated duration before failure or technical incident. These values are for example values of duration before becoming anomalous between performance indicators.

Determining 115 reference values used during a step of calculating the estimated duration before failure or technical incident can for example comprise, based on prior data from the computing infrastructure, the calculation of a duration, for example median or mean duration, between a performance indicator becoming anomalous and the occurrence of a technical incident.

Advantageously, determining 115 reference values used during the calculation of the estimated duration before failure or technical incident can for example comprise, based on prior data from the computing infrastructure, the calculation of a duration, for example median or mean duration, between a first performance indicator becoming anomalous and a second performance indicator, correlated with the first anomalous performance indicator, becoming anomalous. Thus, the estimation of a duration before a technical incident can be more precise and more robust.

Advantageously, following the learning phase, a filter can be applied to the performance indicators collected. Thus, the performance indicators which do not appear to play any role in anticipating anomalies are excluded from the analysis. Performance indicators which do not appear to play any role in anticipating anomalies are for example those with values which do not have any correlation with an identified incident and which do not have a correlation with at least one performance indicator having a direct or indirect correlation with an identified incident. Thus, in particular for certain calibration steps (threshold values, etc.), performance indicators having, on the basis of a set of training data, a direct correlation, preferably a causal connection, with an incident, or an indirect correlation, preferably a causal connection, with an incident, are advantageously retained.

As has been mentioned, once the step 110 of calibration or learning has been carried out, a determination method according to the invention, in its conventional implementation, comprises a step of receiving (120) performance indicator values. This step is generally carried out by a collection module 40 which will be described further during the description of the device according to the invention.

The performance indicator values are generally generated over time by probes then sent to a collection module that centralizes this data before transferring it for example to a processing module. A module 40 for collecting metrics (i.e. performance indicators) can make use of a probe 41 or a plurality of probes 41. The probe(s) 41 make it possible for example to collect data regarding resource usage, resource availability, event logs, hardware errors, software errors, response times, application traffic, working load, network traffic, file modifications, the number of users of a service, session number, process number, temperature values, relative humidity values, water leaks, motion, smoke and power consumption of the computing infrastructure 5. The module 40 can make use of a monitoring file comprising metrics collection rules. These metrics collection rules can specify the data which must be stored during the execution of the application block.

These measurements can for example be carried out using a probe of "Nigel's Monitor" (Nmon) or "Performance Monitor" (Perfmon) type. Nmon probes make it possible for example to display CPU, memory, swap or network data and information on users, groups, storage media, on the use of the kernel, or the processes that consume the most. Probes of Perfmon type make it possible to measure the performance of a computing infrastructure. The information collected may for example correspond to percentages of resource usage, response times, processing times, but also the status of the ports, the number of JDBC or JMS message queues, the occupancy level of the file system, the operating rate of the garbage collector for J2EE (Java Enterprise Edition) applications.

These probes may be associated with each performance indicator (e.g. response time, resource or functionalities) for returning the measurement information or metrics, representing for example the operation of the computing infrastructure. For each performance indicator, the probe(s) define a performance indicator identifier and a performance indicator value. The performance indicator values may be monitored continuously or at configurable intervals so as to obtain information for each performance indicator as a function of time. This information can be stored in a memory. In some embodiments, a device according to the invention comprises a man-machine interface making it possible to define the probes on each machine which return the metrics resulting from the use of the resources of the machine.

As has been mentioned, preferably, during the inference phase, in step 120, only the performance indicators actually used during the analysis in step 110 will be collected. Filtering may be applied centrally, but may also be moved to the different probes or sensors in order to limit the load of the central module.

Additionally, the performance indicators may be subject to a pre-processing 130 of the performance indicator values so as to facilitate the subsequent use thereof.

Pre-processing according to the invention can for example comprise: data normalization, re-sampling, data aggregation, and/or recoding of variables.

Pre-processing 130 according to the invention can comprise at least one data aggregation. For example, the values obtained over a predetermined time range are aggregated. Advantageously, pre-processing 130 according to the invention can comprise differentiated pre-processing steps for each of the performance indicators.

Additionally, as has been presented previously, the performance indicator values can be subject to a strong variation over time, which is inherent to the normal activity or operation of the computing infrastructure.

In particular, the temporal signal generated by the probes can be segmented into three components: a global variation component (also referred to as "trend"), a cyclical or seasonal component, and a residual. However, as has been mentioned, it is the residual value that will be most suited to identifying an abnormal value and therefore an abnormal behavior of the computing infrastructure.

Thus, in order to improve the subsequent identification of abnormal values, a method according to the invention can comprise a decomposition of the values so as to delete a predetermined normal component and optionally delete a predetermined trend component. The deletion of the predetermined normal component and optionally of the predetermined trend component may correspond to a multiplicative or additive deletion of this (these) component(s) depending respectively on the correlation or non-correlation of the residual to these two components. Advantageously, a method according to the invention can comprise a multiplicative deletion and an additive deletion of this (these) components.

Thus, preferably, the step of identifying 140 anomalous performance indicators may be preceded by a step of pre-processing the performance indicator values (i.e. the collected data), i.e. performance indicators, the step of pre-processing the collected data comprising a deletion of the seasonal component. Then, the step of pre-processing 130 the performance indicator values comprises, for the values of each of the performance indicators, a deletion of the normal component calculated beforehand and advantageously it also comprises a deletion of the global variation calculated beforehand.

A determination method according to the invention further comprises a step of identifying 140 anomalous performance indicators. Such a step may be implemented by a data processing module 10.

The detection of atypical observations or anomalies is performed in numerous fields. In the context of the present invention, an atypical observation which is probably generated by a mechanism different from that of the majority of the data usually observed will be considered to be an abnormal value.

The identification 140 of anomalous performance indicators can comprise implementing a statistical method which makes it possible to generate binary results, anomaly probability percentages or any other value making it possible to identify one or more anomalous performance indicators.

The step of identifying 140 anomalous performance indicators can comprise the comparison of a value from each performance indicator to a reference value, so as to determine for example if a threshold has been exceeded. This type of methodology has the advantage of being quick to implement and requiring few calculation resources.

Thus, the identification 140 of anomalous performance indicators may comprise the comparison of the performance indicator values, whether or not pre-processed, to predetermined thresholds.

Nevertheless, comparison to thresholds does not enable optimum discrimination between normal values and abnormal values. Another method of detecting abnormal, or anomalous, values comprises the identification of one or more data points that are highly different from the rest of the data. There is a very large number of different methods making it possible to carry out such a detection of abnormal values.

Next, the step of identifying 140 anomalous performance indicators can comprise a calculation of a distance to normality of the residual values obtained. Further alternatively, the identification 140 of anomalous performance indicators can comprise implementing a statistical method making it possible to generate values of distance to normality for each of the performance indicators.

In particular, it is possible to implement univariate methods or optionally multivariate Mahalanobis distance or Principal Component Analysis methods.

Additionally, for each of the performance indicators, the step of identifying 140 an anomalous performance indicator may comprise a segmentation of the past values of a performance indicator and a calculation of the membership of the performance indicator to one of the groups formed, in particular to a group labeled "abnormal". Thus, it is possible to determine whether or not the performance indicator is a normal value.

As has been detailed, the step 140 of identifying anomalous performance indicators is preferably based on the prior construction of a supervised learning model which will be able to classify the performance indicator value as a normal value or an abnormal value.

For example, during the calibration process, a supervised learning model may have been trained to determine if the value collected for a performance indicator is a normal value or an abnormal value.

Alternatively, during the calibration process, a CART supervised learning model may have been trained to determine a label for performance indicator values studied (e.g. "normal" or "anomalous").

Once the abnormal values have been identified, the identification of performance indicators may correspond to compliance with an order in a sequence of data such as a data vector. Thus, the result of the identification of abnormal values may take the form of an anomaly vector v0 as shown below.

v0=[0 0 1 0 0 1 0 0 1 0 0 0 0 0 0 1 0 0 0 0 0 0 0 0 0 0 0 0 0 1 0 0 0]

Such a vector comprises five anomalous performance indicators (i.e. 1) and 30 performance indicators with normal values (i.e. 0).

Once the abnormal values have been identified, and therefore the "anomalous performance indicators" have been identified, it is possible to identify performance indicators which are not anomalous but which are associated (i.e. correlated) with these "anomalous performance indicators", then referred to as "at-risk performance indicators".

Thus, a determination method according to the invention comprises a step 150 of identifying first at-risk indicators. Such a step may be implemented by a data processing module 10 from a correlation base 21 between performance indicators.

In the context of the present invention, the identification of first at-risk indicators or the prediction of performance indicators at risk of becoming anomalous in a predetermined time interval is based on inter-metrics links to characterize the likelihood of one or more metrics (i.e. performance indicators) becoming anomalous. This identification may be direct or indirect.

In particular, in the context of a direct prediction, the evolution in the metric (i.e. values of a performance indicator) is such that the act of it becoming anomalous is anticipated. For example, with a linear regression or with a standard deviation calculation demonstrating a high volatility.

In particular, in the context of an indirect prediction, the evolution in the metric (i.e. values of a performance indicator) is such that inter-metrics links are used to characterize that the (established or probable) act of becoming anomalous of one or more metrics is such that it leads to one or more other metrics becoming anomalous.

The step of determining at-risk indicators may be carried out from a correlation base 21 between performance indicators. This correlation base is advantageously generated during the determining 113 of inter-performance indicator correlations. A correlation base according to the invention may comprise data for correlation between performance indicators, for example with non-causal correlation links and/or causal correlation links. The causal links can be labeled differently depending on the presence or absence of causality. Additionally, the correlation base may comprise values of duration before becoming anomalous between correlated performance indicators or else correlation indices.

With reference to the anomaly vector v0 shown above, step 150 relates to determining the performance indicators that, according to a correlation base 21 between performance indicators, are correlated with the five performance indicators identified as anomalous during step 140.

This determination step 150 comprises in particular an identification of performance indicators of the computing infrastructure that are directly correlated with the previously identified (during step 140) anomalous indicators. These performance indicators identified during step 150 can be referred to as first at-risk performance indicators.

The performance indicators of the computing infrastructure that are correlated with the previously identified anomalous indicators can be identified by one or more previously established correlation bases (or tables or matrices) 21, as has been described previously. Such correlation bases 21 comprise links between a performance indicator and one or more other performance indicators. Indeed, some anomalies on one or more metrics can be caused by other anomalies occurring on other metrics, thereby leading to a domino effect.

In particular, the identification of performance indicators of the computing infrastructure that are correlated with the identified anomalous indicators can advantageously be carried out based on a correlation table, storing in memory the inter-performance indicator correlations.

It should be noted that the correlation will or will not be associated with a causal link. Thus, while the method may be based on correlation links which are not necessarily causal, the identification of performance indicators of the computing infrastructure that are correlated with the anomalous indicators may advantageously be carried out based on a causality table (or base or matrix) storing in memory the inter-performance indicator causal links. The identification of the causal relationships can be carried out by different techniques of causal inference.

As has been presented, the step 150 of identifying first at-risk indicators comprises the identification of performance indicators of the computing infrastructure that are correlated with the anomalous indicators. These identified performance indicators may be referred to as first at-risk performance indicators. Indeed, they were obtained by searching for performance indicators directly correlated with the anomalous performance indicators.

A method according to the invention also comprises an identification 160 of other at-risk performance indicators. These other at-risk performance indicators are in particular performance indicators of the computing infrastructure 5 that are correlated with the first at-risk performance indicators. These performance indicators may also be referred to as performance indicators with a second-level risk. The step 160 of identifying at-risk indicators mat be limited to searching for performance indicators with a second-level risk. Nevertheless, it preferably further comprises an identification of performance indicators of the computing infrastructure that are correlated with the performance indicators with a second-level risk. These at-risk performance indicators may be referred to as performance indicators with a third-level risk.

Thus, the identification of performance indicators of the computing infrastructure that are correlated with at-risk performance indicators can be continued for example until there are no longer any new performance indicators of the computing infrastructure that are correlated with the at-risk performance indicators.

Such a step may be implemented by the data processing module 10 from a correlation base 21 between performance indicators.

Once at-risk performance indicators have been identified, a method according to the invention can comprise a step of creating an augmented anomalies vector. Such a step generally corresponds to the result of a step of determining at-risk indicators. Nevertheless, when the step of determining at-risk indicators is carried out independently by a sub-system of the computing infrastructure, then this step may comprise a concatenation of data to form an augmented anomaly vector.

The augmented anomaly vector comprises in particular values associated with the anomalous performance indicators and values associated with the at-risk performance indicators. The augmented anomaly vector particularly comprises values making it possible to differentiate between at least three categories of performance indicators, namely, for example, non-anomalous performance indicators, anomalous performance indicators and at-risk performance indicators.

v1=[0 0 1 0 0 1 2 0 1 0 2 0 0 0 0 1 2 0 0 0 0 3 0 0 0 2 0 0 2 0 0 1 0 0 0]

For example, the vector v1 above comprises values associated with the anomalous performance indicators (i.e. 1), values associated with the performance indicators with a first-level risk (i.e. 2), and values associated with the performance indicators with a second-level risk (i.e. 3). It additionally comprises values associated with performance indicators not belonging to these categories (i.e. 0).

Preferably, the augmented anomaly vector further comprises indicators with a second-level risk, said indicators with a second-level risk being performance indicators of the computing infrastructure that are correlated with the at-risk indicators.

Additionally preferably, in the augmented anomaly vector, the value associated with the at-risk performance indicators may correspond to a probability of becoming an anomalous indicator within a predetermined time interval. More preferably, in the augmented anomaly vector, the values associated with the anomalous or at-risk performance indicators may correspond to an estimated duration before the performance indicator becomes anomalous. The estimated duration before a technical incident corresponds for example to a mean or median duration observed in the past, between the moment at which a performance indicator exhibited an abnormal value and a technical incident on the computing infrastructure.

Thus, aside from the concept of a risk of technical incident, a method according to the invention may make it possible to generate an estimated duration before a probable technical incident.

Additionally, the augmented anomaly vector may comprise one, but also several, series of data. In this case it may also be termed a matrix. An augmented anomaly vector comprising several series of data may make it possible to generate more precise information on the risks of technical incident burdening the computing infrastructure.

The augmented anomaly vector is a data structure that expresses, for each metric, if it is anomalous or if it could become anomalous, in light of the current observed state of the computing infrastructure. Preferably, for each scenario, the anomaly vector comprises a value of the level of confidence of becoming anomalous for each of the metrics (i.e. performance indicators). Thus, a technical incident risk value determined in the context of the method may take into account a confidence level value calculated in the context of the method. A confidence level value may for example be calculated on the basis of prior data of the values of coefficients of correlation between the performance indicators.

Preferably, the augmented anomaly vector further comprises, for each of the at-risk indicators, an estimated value of duration before the performance indicator becomes anomalous. The augmented anomaly vector can further comprise, for each of the anomalous and/or at-risk indicators, an estimated value of duration before a technical incident.

Advantageously, an augmented anomaly vector comprises data at least relating to the value of the estimated duration before becoming anomalous and a confidence score (e.g. calculated from confidence level values).

The augmented anomaly vector may comprise numerous other series of data.

The augmented anomaly vector can comprise data relating to performance indicators that are not anomalous or at risk of anomaly. Alternatively, it may comprise data only for anomalous or at-risk performance indicators. Preferably, the value associated with the performance indicators is selected from: a current status of the performance indicators (anomalous, at-risk, normal), a predicted date for becoming anomalous, a predicted duration before becoming anomalous, an index of confidence (i.e. value of the level of confidence) in the prediction of becoming anomalous and/or an index of confidence in the predicted date of change of state.

More preferably, a value associated with the performance indicators is selected from: a current status of the performance indicators (anomalous, at-risk, normal), a predicted date for becoming anomalous, and/or a predicted duration before becoming anomalous.

Even more preferably, a value associated with the performance indicators corresponds to a predicted date for becoming anomalous.

Once the at-risk performance indicators have been identified, a method according to the invention comprises a step of determining 170 an estimated duration before a technical incident. Such a step may be implemented by a data processing module 10. Additionally, such a step may be based on reference values such as durations (e.g. median or mean) between a first performance indicator becoming anomalous and a second performance indicator, correlated with the first anomalous performance indicator, becoming anomalous.

Figure 3:
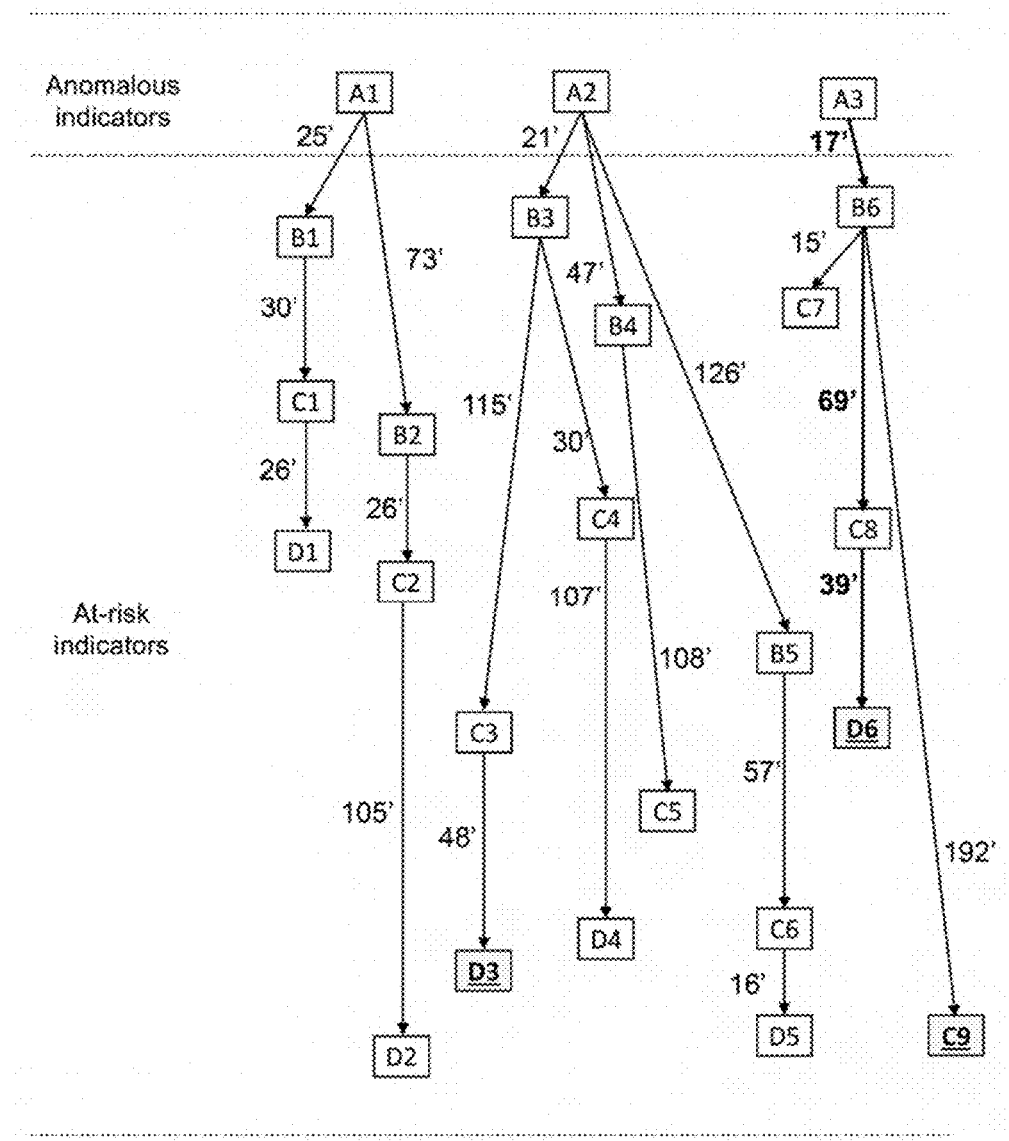
FIG. 3 shows a graphical illustration of an anomaly prediction in a computing infrastructure, taking into account durations before becoming anomalous and in particular a determination of an estimated duration before technical incident.

A schematic illustration of a calculation of the shortest path is shown in FIG. 3. In this illustration, three anomalous indicators are depicted A1, A2, A3 with six first at-risk indicators B1, B2, B3, B4, B5, B6 with which they are correlated. FIG. 3 also shows nine indicators with a second-level risk C1, C2, C3, C4, C5, C6, C7, C8, C9, and six indicators with a third-level risk D1, D2, D3, D4, D5, D6. From these twenty four performance indicators, two performance indicators C9, D6 lead to a failure of the computing infrastructure 5 when they become anomalous. Moreover, the actual or predicted act of becoming anomalous of the combination of indicators A2, B3, C3 and D3 can be correlated with a reference vector associated with a technical incident. FIG. 3 further shows durations before becoming anomalous between correlated performance indicators. For example, when the performance indicator A1 becomes anomalous, it is estimated that the indicator B1, which is correlated therewith, becomes anomalous after twenty five minutes (reference "25" in FIG. 3), while the indicator B2, which is also correlated therewith, becomes anomalous after seventy three minutes (reference "73" in FIG. 3).

In particular, the step of determining 170 an estimated duration before a technical incident can comprise a calculation, using identified anomalous indicators and at-risk indicators, of a shorter path leading to a risk of technical incident. The shortest path can correspond to a path leading to a failure for which the sum of the durations before becoming anomalous between correlated performance indicators is shortest.

For example with reference to FIG. 3, the three paths that can lead to technical incidents (i.e. indicators D3, D6, C9) each total, respectively: 184 minutes, 125 minutes, and 209 minutes. Thus, the path involving A3, B6, C8 and D6 will probably most quickly lead to a failure. The estimated duration before technical incident is therefore 125 minutes.

In particular, the step of determining 170 an estimated duration before a technical incident can comprise a calculation of an estimated duration from values of duration before becoming anomalous between correlated performance indicators. This can be carried out for each of the performance indicators constituting a path that can lead to a failure of the computing infrastructure.

Thus, the method may comprise: identifying paths that can lead to a failure, calculating the duration before failure for each of these paths, and identifying the shortest (i.e. quickest) path leading to a risk of technical incident. Additionally, the calculation of a shortest path leading to a risk of technical incident and the calculation of an estimated duration before a technical incident can be carried out concomitantly or successively.

The shortest path can also be weighted with confidence level values calculated for each performance indicator at risk of becoming anomalous.

Advantageously, the step of determining 170 an estimated duration before a technical incident may comprise implementing an algorithm based on graph theory.

A method according to the invention may further comprise a step of determining 180 a technical incident risk value. Such a step may be implemented by a data processing module 10.

Determining 180 a technical incident risk value corresponds to a step of carrying out a prediction of a technical incident on the computing infrastructure 5, or else the calculation of a risk of technical incident. Indeed, by virtue of the data on the at-risk performance indicators and in particular by virtue of an augmented anomaly vector, a dataset is generated that reflects a probable behavior of the computing infrastructure 5 in the coming hours.

Determining 180 a technical incident risk value can be carried out by numerous methods. Generally, determining 180 a technical incident risk value will be based on a comparison of data relating to at-risk performance indicators and in particular an augmented anomaly vector to reference values determined, for example, during step 114.

It is for example possible to compare the number of anomalous performance indicators and at-risk performance indicators to predetermined thresholds so as to determine a risk value.

In addition, methods can be implemented, based on statistical methods making it possible to obtain more sensitive and more specific results.

For example, a step of measuring the distance between the augmented anomaly vector and reference vectors may be implemented. These reference vectors may for example comprise vectors generated under normal operating conditions of the computing infrastructure and anomaly vectors generated before and/or during the occurrence of a technical incident on the computing infrastructure.

Preferably, a step of calculating the similarity between the augmented anomaly vector and reference vectors, such as incident reference vectors, may for example be implemented. Incident reference vectors are vectors observed during or before a technical incident on the computing infrastructure. Similarity can then be defined as the percentage of identical performance indicators between two vectors. Thus, during the inference, a similarity threshold makes it possible to state whether a vector can be considered to be an incident reference vector.

Preferably, a step of classifying the augmented anomaly vector within a vector classification model comprising groups of vectors associated with normal operation and groups of vectors associated with a technical incident may for example be implemented. During learning, two types of vectors are learned: incident reference vectors and normal reference vectors.

In particular, in the context of the step 180 of determining a technical incident risk value, there may be a comparison and calculation of a distance between the augmented anomaly vector and different predetermined groups associated with failures. For example, if the distance is large, i.e. for example greater than a predetermined threshold, then an incident risk value is generated indicating an absence of risk; if the distance is small (e.g. less than a predetermined threshold), then an incident risk value is generated indicating a prediction of an incident, and finally, if the distance is average (e.g. between two predetermined thresholds) then the incident risk value may correspond to placing under monitoring. Preferably, the augmented anomaly vector is compared to groups of technical incident vectors and to groups of normal vectors so as to generate distance values. Next, the distance values between the augmented anomaly vector and each of the two groups is compared so as to determine whether or not there is an absence of risk.

In particular, a first grouping together may be carried out using an algorithm of K-means type, then each augmented anomaly vector is compared to the normal and incident reference vectors using the k nearest neighbor method.

Additionally, the methods described above can be improved by taking into account the date on which the vectors were generated. For example, a classification may take into account both the components of the vector and also the time at which it appeared. The hypothesis is that vectors that are close to one another (in time) have a greater chance of belonging to the same group than vectors that are apart from one another. This applies in particular during the learning and classification of the reference vectors.

Additionally, once the at-risk performance indicators have been identified, a method according to the invention can comprise a step of determining 185 an anomaly prediction performance index value. Such a step may be implemented by a data processing module 10.

An anomaly prediction performance index value according to the invention may for example be in the form of a percentage of confirmed performance indicators at risk of anomaly. That is to say, a percentage of performance indicators that have been identified as being at risk of anomaly (e.g. during a step of determining 150 at-risk indicators) and identified as new confirmed anomalous indicators between the time at which they were identified as being at risk and for example an instant at which information relating to a prevented incident or a solved incident was received by the computing device 1. It may also correspond to the following formula:

$$IPerf = |\text{at-risk } PI \cap \text{confirmed } PI| / |\text{at-risk } PI \cup \text{confirmed } PI|$$

With:
IPerf: the value of the performance index
At-risk PI: the performance indicators that have been identified as being at risk of anomaly
Confirmed PI: new confirmed anomalous indicators For example, in the context of the method according to the invention, anomalous performance indicators and also at-risk indicators, i.e. performance indicators which are not anomalous at a given instant but are correlated with these anomalous performance indicators, can be identified. During a step of determining 185 an anomaly prediction performance index value, new confirmed (actual) anomalous indicators may be determined, which it will be possible to compare to the (predicted) at-risk indicators.

TABLE 1

|  | Predicted | Actual - case 1 | Actual - case 2 |
| --- | --- | --- | --- |
| First at-risk indicators/new confirmed anomalous indicators | B1, B2, B3, B4, B5, B6 | B1, B2, B3, B4, B5, B6 | B1, B2, B3, B4, B5 |
| Second at-risk indicators/new confirmed anomalous indicators | C1, C2, C3, C4, C5, C6, C7, C8, C9 | C1, C2, C3, C4, C5, C6, C7, C8, C10 | C1, C2, C3, C4, C5, C6, C11 |
| Third at-risk indicators/new confirmed anomalous indicators | D1, D2, D3, D4, D5, D6 | D1, D2, D3, D4, D5, D6 | D1, D2, D3, D4, D5, D7 |
| Performance index | na | 90.9% | 66.6% |

Two cases have been shown in Table 1 above. In the first case (case 1), the new confirmed anomalous indicators are virtually identical to the predicted indicators, thus the performance index is high (90.9%). On the contrary, in the second case (case 2), there are numerous differences with non-predicted anomalous indicators such as C11 and D7 and also anomalous indicators that were predicted but not realized, such as B6, C7, C8, C9 and D6. The result thereof is a low performance index (66.6%).

Moreover, a method according to the invention may comprise a step of generating updated values of duration before becoming anomalous. In particular, a method according to the invention may then comprise a comparison between stored values of duration before becoming anomalous and updated values of duration before becoming anomalous. Such a comparison can be used to determine the performance index value. In this case, the performance index value will be low, considering the differences observed between values of duration before becoming anomalous.

Additionally, the method may also then comprise a step of modifying the values of durations before becoming anomalous that are stored in memory in the correlation base 21, based on updated values of duration before becoming anomalous. This modification may be carried out in different ways, for example using the updated value in the calculation of a mean, a median or more broadly still in the calculation of a new value which will be based on the old value and on the updated value.

Once the estimated duration before technical incident has been calculated, a method according to the invention can comprise a step 190 of transmitting a value of estimated duration before technical incident. Step 190 may also comprise transmitting an anomaly prediction performance index value and/or transmitting a technical incident risk value.

Additionally, a method 100 according to the invention may enable the generation of a dashboard comprising, for example:

the mean number of (identified or predicted) anomalies,
the distribution of the (identified or predicted) anomalies by functional island,
the evolution in the number of (identified or predicted) anomalies, for example by functional island,
the sequence of anomalies that caused the technical incident,
the estimated time before technical incident, and/or
the percentage of confidence in the prediction.

Additionally, the step of transmitting and/or displaying 190 this value of estimated duration before technical incident can be preceded by a step of aggregating the predictions. Indeed, if a value of estimated duration before technical incident or of risk of technical incident is determined every 5 minutes, and on the date T0 an incident is predicted to occur on the date T1=T0+1 h, a method according to the invention is advantageously configured not to display to the user a new incident predicted on the dates T0+5, T0+10 ... T0+55, but rather to determine that the incident is the same at that predicted on T0, so as not to overwhelm the operator with warnings.

Additionally, a method according to the invention may use the identification of the same prediction made at successive time intervals in order to modify a level of confidence and strengthen the confidence in the prediction.

Preferably, a method according to the invention comprises generating a dashboard comprising the estimated time before the incident or the estimated time of the technical incident and the percentage confidence in the prediction.

Thus, the inventors have developed a methodology which makes it possible to improve the prediction of abnormal values within a multitude of metrics that are continuously monitored and analyzed in real time. This invention is based in particular on predictive analyses making it possible to determine, from weak signals, the time and the probability of occurring of a future technical incident.

From the correctly identified abnormal values, it is possible to evaluate the risk of an incident by comparisons/correlations with incidents that have occurred beforehand or, if possible, by using a predictive incident model trained on historical data.

According to another aspect, the invention relates to a device 1 for determining an estimated duration before a technical incident in a computing infrastructure 5.

Figure 4:
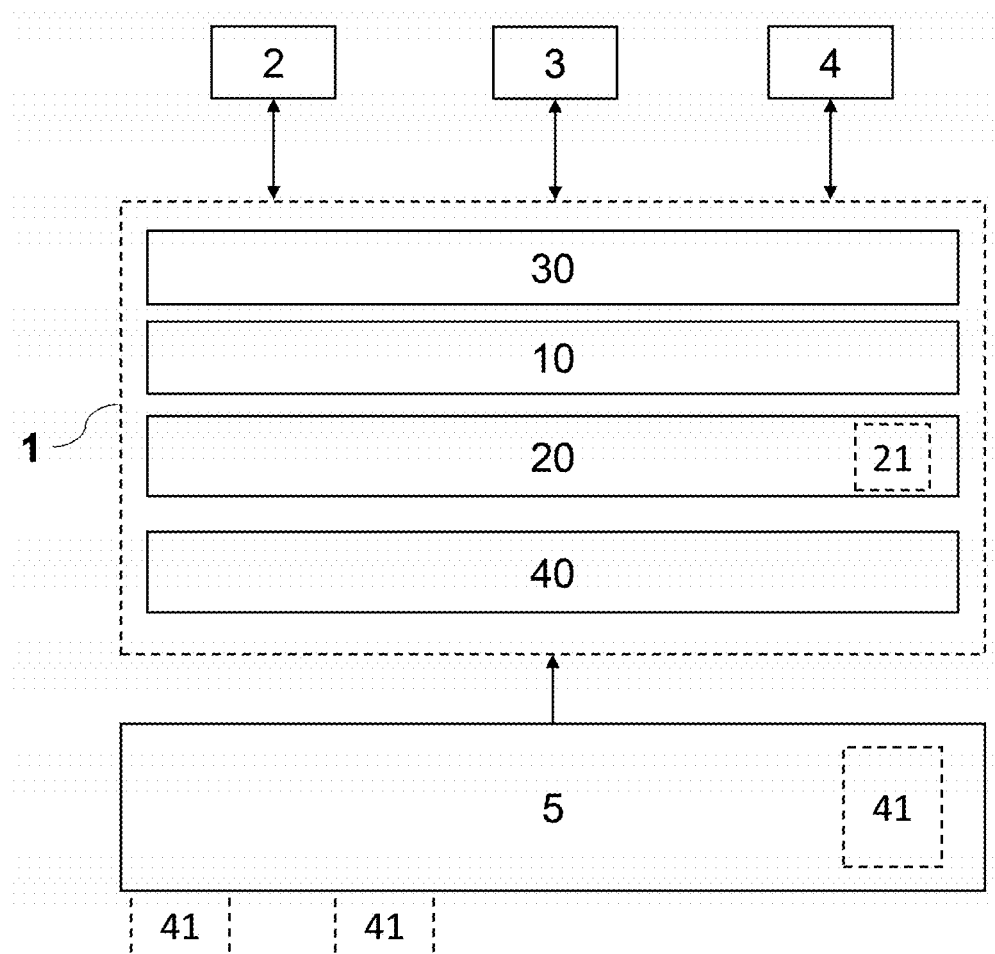
FIG. 4 shows a diagram of a device for determining an estimated duration before technical incident in a computing infrastructure according to the invention.

A device 1 or computing device 1 according to the invention is shown in FIG. 4.

The computing device 1 is in particular configured to determine a value of estimated duration before a technical incident in a computing infrastructure 5 from data (e.g. performance indicator values) collected by probes dedicated to monitoring performance indicators of the computing infrastructure 5.

The computing device 1 may comprise a storage module 20. As described hereinafter, this storage module 20 is configured to store in memory all the data and values generated during the calibration/learning steps 110. Additionally, it can be configured to store in memory augmented vectors generated over time or estimated durations. In particular, it is configured to store in memory at least one correlation base 21 between performance indicators, said correlation base 21 comprising values of duration before becoming anomalous between performance indicators.

The values of duration before becoming anomalous between performance indicators may correspond in particular to observed durations (e.g. mean, median, etc.) between a first performance indicator becoming anomalous and a second performance indicator, correlated with the first performance indicator, becoming anomalous.

The storage module 20 is preferably configured to store in memory: one or more profiles of normality as a function of time, reference values which can be used during the identification of abnormal values, a correlation base 21 (e.g. table or matrix), a causality base, reference values used during the identification of a technical incident risk, and/or reference values used during a step of calculating the estimated duration before failure.

For this purpose, the storage module 20 can comprise any computer-readable support known in the art comprising, for example, a volatile memory, such as a static random access memory (SRAM) and a dynamic random access memory (DRAM), and/or a non-volatile memory, such as a read-only memory, flash memories, hard drives, optical disks and magnetic tapes. The storage module 20 may comprise a plurality of instructions or modules or applications for performing various functionalities. Thus, the storage module 20 may implement routines, programs, or data structures of matrix type. Preferably, the storage module 20 may comprise a medium readable by a computing system in the form of a volatile memory, such as a random access memory (RAM) and/or a cache memory. The storage module 20, like the other modules, may for example be connected to the other components of the device 1 via a communication bus and one or more data medium interfaces.

Additionally, the computing device 1 may also comprise a communication module 30.

A communication module 30 according to the invention is in particular configured to exchange data with third-party devices. The device 1 communicates with other devices or computing systems and in particular clients 2, 3, 4 by virtue of this communication module 30. The communication module additionally makes it possible to transmit the data over at least one communication network and may comprise wired or wireless communication. Preferably, the communication is carried out via a wireless protocol such as WiFi, 3G, 4G and/or Bluetooth. These data exchanges may take the form of sending and receiving files. For example, the communication module 30 can be configured to transmit a printable file. The communication module 30 may in particular be configured to enable communication with a remote terminal, including a client 2, 3, 4. A client is generally any hardware and/or software able to communicate with a device in accordance with the invention. The communication module 30 may also be configured to communicate via a man-machine interface.

Additionally, the computing device 1 may also comprise a metrics collection module 40. A metrics collection module 40 according to the invention is in particular configured to measure resource usage, resource availability, event logs, hardware errors, software errors, response times, application traffic, working load, network traffic, file modifications, the number of users of a service, session number, process number, temperature values, relative humidity values, water leaks, motion, smoke and/or power consumption. To this end, the metrics collection module 40 can make use of a probe 41 or a plurality of probes 41, already described.

The computing device 1 comprises in particular a data processing module 10. The computing device 1, more particularly the data processing module 10, is advantageously configured to execute a method according to the invention. Thus, the data processing module 10 may correspond to any hardware and software arrangement able to allow the execution of instructions.

In particular, the data processing module 10 is configured to execute the following steps:
- a step of identifying anomalous performance indicators, said identification comprising an analysis of the performance indicator values so as to identify abnormal values and performance indicators associated with these abnormal values,
- a step of identifying first at-risk indicators, from the correlation base 21 between performance indicators, said first at-risk indicators being performance indicators that are correlated with the anomalous performance indicators identified,
- a step of identifying other at-risk indicators, from the correlation base 21 between performance indicators, said other at-risk indicators being performance indicators that are directly or indirectly correlated with the first at-risk performance indicators identified, and
- a step of determining an estimated duration before a technical incident, comprising:

a. a calculation, from the anomalous indicators and the at-risk indicators identified, of a shorter path leading to a risk of technical incident, and b. a calculation of an estimated duration before a technical incident, said estimated duration before a technical incident being calculated from values of duration before becoming anomalous between correlated performance indicators for each of the performance indicators constituting the shortest path calculated.

Additionally, the data processing module 10 is advantageously configured to execute the different embodiments of a method according to the invention.

The different modules or repositories are discrete in FIG. 4, but the invention may provide various types of arrangement, such as a single module combining the set of functions disclosed here. Likewise, these means may be divided across a plurality of electronic cards or grouped together on one single electronic card.

A device 1 according to the invention may be integrated into a computing system and thus be able to communicate with one or more external devices such as a keyboard, a pointing device, a display, or any device enabling a user to interact with the device 1. It should be appreciated that, although not shown, other hardware and/or software components could be used in conjunction with a device 1. Thus, in an embodiment of the present invention, the device 1 can be coupled to a man-machine interface (MMI). The MMI, as already discussed, can be used to enable the transmission of parameters to devices or, conversely, to make available to the user values of data measured or calculated by the device. The MMI is generally coupled communicatively with a processor and it comprises a user output interface and a user input interface. The user output interface may comprise a display and audio output interface and various indicators such as visual indicators, audible indicators and haptic indicators. The user input interface may comprise a keyboard, a mouse or another cursor navigation module such as a touch screen, a touch pad, a stylus input interface and a microphone for the input of audible signals such as user speech, data and commands which can be recognized by the processor.

In an embodiment of the present invention, the device 1 can be coupled to a communication interface, for example a network of Ethernet, FiberChannel, InfiniBand type or any other devices enabling the device 1 to communicate with one or more other computing devices.

According to another aspect, the invention relates to a computer program, or computer program product, comprising instructions for implementing a method according to the invention. Such a computer program product may in particular be subdivided into several sub-programs such as a frontal program and several pieces of background software.

Thus, as will be appreciated by those skilled in the art, aspects of the present invention can be carried out as device, system, method or computer program product. Consequently, aspects of the present invention may be in the form of an entirely hardware embodiment, an entirely software embodiment (comprising firmware, a resident software, a microcode, etc.) or a particular embodiment such as a "circuit", "module" or "system". Additionally, aspects of the present invention may be in the form of a computer program product incorporated in one or more computer-readable media having a computer-readable program code incorporated thereon.

Any combination of one or more computer-readable media may be used. In the context of this document, a computer-readable medium may be any physical medium which can contain or store a program to be used by, or in relation with, a system for executing instructions, apparatus or device. A computer-readable medium may for example be, without being limited thereto, a system, apparatus or device which is electronic, magnetic, optical, electromagnetic, infrared or semiconducting, or any suitable combination of the foregoing. More specific examples (a non-exhaustive list) of the computer-readable storage medium would comprise: a hard drive, random access memory (RAM).

A computer program code for carrying out operations for aspects of the present invention can be written in any combination of one or more programming languages, including an object-oriented programming language such as Java, C++ or the like, the "C" programming language or similar programming languages, a scripting language such as Perl, or similar languages, and/or functional languages such as Metalanguage. The program code may be executed entirely on a user's computer, partially on a user's computer and partially on a remote computer, or entirely on the remote computer or server. In the latter scenario, the remote computer can be connected to a user's computer by any type of network, including a local network (LAN) or an extended network (WAN).

These computer program instructions may be stored on a computer-readable medium that can control a computing device (e.g. computer, server, etc.), such that the instructions stored in the computer-readable medium produce a computing device configured to implement the invention.

Thus, devices, systems, methods or computer program products according to the invention make it possible, aside from the detection of anomalies, to determine a value of estimated duration before failure (i.e. technical incident) for a computing infrastructure 5. Advantageously, the invention makes it possible to set up predictive maintenance on a computing infrastructure 5 capable of enabling the maintenance service to take action before service interruption is triggered, thereby reducing the response time of the maintenance service and reducing the occurrence of failures on the monitored computing infrastructure.

This is made possible since, unlike other systems, the invention comprises determining a risk of failure from weak signals. This is particularly advantageous in a context in which anticipating incidents is made complex due to the large variability in the operating metrics of these infrastructures. Here, the enhancement of anomalous performance indicators with data relating to performance indicators at risk of becoming anomalous makes it possible to calculate an estimated duration before failures from weak signals which would have eluded monitoring services (or which have already eluded the vigilance of monitoring services).

What is claimed is:

1. A method for determining an estimated duration before a technical incident in a computing infrastructure, said method being executed by a computing device, said computing device comprising a data processing module, a storage module configured to store in memory at least one correlation base between performance indicators, said at least one correlation base comprising values of duration before becoming anomalous between said performance indicators that are correlated, and a collection module, said method comprising:
  receiving, by the collection module, performance indicator values of a computing infrastructure,
  identifying anomalous performance indicators, by the data processing module, said identifying anomalous performance indicators comprising an analysis of the performance indicator values to identify abnormal values and performance indicators associated with these abnormal values,
  identifying first at-risk indicators, by the data processing module from the at least one correlation base, said first at-risk indicators being performance indicators that are correlated with the anomalous performance indicators that are identified,
  identifying other at-risk indicators, by the data processing module from the at least one correlation base, said other at-risk indicators being performance indicators that are directly or indirectly correlated with the first at-risk indicators identified, and
  determining, by the data processing module, an estimated duration before a technical incident in the computing infrastructure to predict failures from weak signals, said estimated duration before a technical incident being calculated from the values of duration before becoming anomalous of the at least one correlation base for the first at-risk indicators that are identified and the other at-risk indicators that are identified,
  wherein the values of duration before becoming anomalous corresponds to the duration between an occurrence of an abnormal value for a performance indicator in question and an occurrence of an abnormal value for a performance indicator correlated with the performance indicator in question,
  wherein the determining the estimated duration comprises
    a calculation, from the first at-risk indicators that are identified and the other at-risk indicators that are identified, of several paths leading to a risk of technical incident,
      such that the estimated duration before a technical incident of the computing infrastructure is selected from several alternatives as said several paths,
    a calculation, from the first at-risk indicators that are identified and the other at-risk indicators that are identified, of a shortest path from said several paths leading to a risk of technical incident,
      such that a potential sequence of anomalies which will most quickly lead to failure of the computing infrastructure is identified as said shortest path, and
    converting the shortest path of said several paths into a chain of temporal values which, when added together, identify the estimated duration before technical incident.

2. The method according to claim 1, wherein the identifying anomalous performance indicators is preceded by a step of processing the performance indicator values, said step of processing the performance indicator values comprising a deletion of a normal component.

3. The method according to claim 1, wherein the identify of abnormal values is carried out by a statistical method making it possible to generate values of distance to normality.

4. The method according to claim 1, wherein the identifying of anomalous performance indicators of the computing infrastructure that are correlated with the anomalous performance indicators that are identified is carried out based on inter-performance indicator causal correlations.

5. The method according to claim 1, further comprising calculating a technical incident risk value.

6. The method according to claim 1, further comprising determining, by the data processing module, an anomaly prediction performance index value comprising:
  receiving new performance indicator values;
  identifying new confirmed anomalous indicators, said identifying new confirmed anomalous indicators comprising an analysis of the new performance indicator values so as to identify abnormal values and performance indicators associated with these abnormal values, and
  comparing the first at-risk indicators and the other at-risk indicators that are identified to the new confirmed anomalous indicators to generate a performance index value.

7. The method according to claim 6, further comprising generating updated values of duration before becoming anomalous, a value of duration before becoming anomalous corresponding to a duration between an occurrence of an abnormal value for a performance indicator in question and an occurrence of an abnormal value for a performance indicator correlated with the performance indicator in question.

8. The method according to claim 7, wherein the at least one correlation base comprises values of durations before becoming anomalous between performance indicators, and in that the method further comprises a step of modifying the values of duration before becoming anomalous between the performance indicators that are stored in the memory in the at least one correlation base, based on the updated values of duration before becoming anomalous.

9. The method according to claim 1, further comprising storing in the memory, for each performance indicator: a unique identifier and at least one unique identifier of another performance indicator correlated therewith, with a value of duration before becoming anomalous of said another performance indicator.

10. A non-transitory computer program product for determining an estimated duration before a technical incident in a computing infrastructure comprising program code instructions for execution, on a computing device, of a method for determining an estimated duration before a technical incident in a computing infrastructure, said computing device comprising a data processing module, a storage module configured to store in memory at least one correlation base between performance indicators, said at least one correlation base comprising values of duration before becoming anomalous between said performance indicators that are correlated, and a collection module, said method comprising:
  receiving, by the collection module, performance indicator values of a computing infrastructure, identifying anomalous performance indicators, by the data processing module, said identifying anomalous performance indicators comprising an analysis of the performance indicator values to identify abnormal values and performance indicators associated with these abnormal values, identifying first at-risk indicators, by the data processing module from the at least one correlation base, said first at-risk indicators being performance indicators that are correlated with the anomalous performance indicators that are identified, identifying other at-risk indicators, by the data processing module from the at least one correlation base, said other at-risk indicators being performance indicators that are directly or indirectly correlated with the first at-risk indicators that are identified, and determining, by the data processing module, an estimated duration before a technical incident in the computing infrastructure to predict failures from weak signals, said estimated duration before a technical incident being calculated from the values of duration before becoming anomalous of the at least one correlation base for the first at-risk indicators that are identified and the other at-risk indicators that are identified, wherein the values of duration before becoming anomalous corresponds to the duration between an occurrence of an abnormal value for a performance indicator in question and an occurrence of an abnormal value for a performance indicator correlated with the performance indicator in question, wherein the determining the estimated duration comprises
a calculation, from the first at-risk indicators that are identified and the other at-risk indicators that are identified, of several paths leading to a risk of technical incident,
such that the estimated duration before a technical incident of the computing infrastructure is selected from several alternatives as said several paths,
a calculation, from the first at-risk indicators that are identified and the other at-risk indicators that are identified, of a shortest path from said several paths leading to a risk of technical incident,
such that a potential sequence of anomalies which will most quickly lead to failure of the computing infrastructure is identified as said shortest path, and
converting the shortest path of said several paths into a chain of temporal values which, when added together, identify the estimated duration before technical incident.

11. The non-transitory computer program product of claim 10, further comprising a computer-readable storage medium on which the computer program code instructions is stored.

12. A computing device for determining an estimated duration before a technical incident in a computing infrastructure, said computing device comprising:

a data processing module,
a storage module configured to store in memory at least one correlation base between performance indicators, said at least one correlation base comprising values of duration before becoming anomalous between said performance indicators, and
a collection module, said collection module configured to receive performance indicator values of the computing infrastructure,
wherein said data processing module is configured to
identify anomalous performance indicators, said identify anomalous performance indicators comprising an analysis of the performance indicator values to identify abnormal values and performance indicators associated with these abnormal values,
identify first at-risk indicators, from the at least one correlation base, said first at-risk indicators being performance indicators that are correlated with the anomalous performance indicators that are identified,
identify other at-risk indicators, from the at least one correlation base, said other at-risk indicators being performance indicators that are directly or indirectly correlated with the first at-risk indicators that are identified, and
determine an estimated duration before a technical incident, said estimated duration before a technical incident being calculated from values of duration before becoming anomalous of the at least one correlation base for the first at-risk indicators that are identified and the other at-risk indicators that are identified,
wherein the values of duration before becoming anomalous corresponds to the duration between an occurrence of an abnormal value for a performance indicator in question and an occurrence of an abnormal value for a performance indicator correlated with the performance indicator in question,
wherein the determining the estimated duration comprises
a calculation, from the first at-risk indicators identified and the other at-risk indicators identified, of several paths leading to a risk of technical incident,
such that the estimated duration before a technical incident of the computing infrastructure is selected from several alternatives as said several paths,
a calculation, from the first at-risk indicators identified and the other at-risk indicators identified, of a shortest path from said several paths leading to a risk of technical incident,
such that a potential sequence of anomalies which will most quickly lead to failure of the computing infrastructure is identified as said shortest path, and
converting the shortest path of said several paths into a chain of temporal values which, when added together, identify the estimated duration before technical incident.

* * * * *